US010191702B2

(12) United States Patent
Nagata

(10) Patent No.: US 10,191,702 B2
(45) Date of Patent: Jan. 29, 2019

(54) JOB EXECUTION DEVICE FOR DISTRIBUTING THE PROCESS FOR EXECUTING THE JOB

(71) Applicant: KONICA MINOLTA, INC., Chiyoda-ku, Tokyo (JP)

(72) Inventor: Akihiro Nagata, Hachioji (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 15/723,627

(22) Filed: Oct. 3, 2017

(65) Prior Publication Data
US 2018/0101345 A1 Apr. 12, 2018

(30) Foreign Application Priority Data
Oct. 12, 2016 (JP) .................. 2016-200955

(51) Int. Cl.
G06F 3/12 (2006.01)
H04N 1/00 (2006.01)
(Continued)

(52) U.S. Cl.
CPC .......... G06F 3/1241 (2013.01); G06F 3/1205 (2013.01); G06F 3/1222 (2013.01); G06F 3/1226 (2013.01); G06F 3/1236 (2013.01); G06F 3/1258 (2013.01); H04N 1/00347 (2013.01); H04N 1/00411 (2013.01); H04N 1/00424 (2013.01); H04N 1/00435 (2013.01); H04N 1/00472 (2013.01); H04N 1/00474 (2013.01); H04N 1/00503 (2013.01); H04N 1/00506 (2013.01); H04N 1/32545 (2013.01); H04N 1/32555 (2013.01); H04N 1/00795 (2013.01); H04N 2201/001 (2013.01); H04N 2201/007 (2013.01); H04N 2201/0013 (2013.01); H04N 2201/0036 (2013.01);
(Continued)

(58) Field of Classification Search
None
See application file for complete search history.

(56) References Cited

U.S. PATENT DOCUMENTS

2008/0123130 A1* 5/2008 Matsumoto ........... G06F 3/1207
358/1.15
2014/0146358 A1* 5/2014 Morita ............... H04N 1/00352
358/1.15

FOREIGN PATENT DOCUMENTS

JP 2016-122331 A 7/2016

* cited by examiner

Primary Examiner — Dov Popovici
(74) Attorney, Agent, or Firm — Buchanan Ingersoll & Rooney PC

(57) ABSTRACT

A job execution device, including: an operation panel; a communicator for communicating with another job execution device; and a hardware processor that: displays its own operation window and the operation window of the another job execution device on the operation panel; receives a setting of a distribution process for distributing a process for executing the job relating to a first function between the job execution device and the another job execution device by a predetermined operation, when a selection button of the first function exists in both of its own operation window and the operation window of the another job execution device; and instructs the job executor of the job execution device and the another job execution device to carry out the distribution process, when an entry of the job relating to the first function is received in a situation in which the distribution process is set.

10 Claims, 12 Drawing Sheets

(51) Int. Cl.
*H04N 1/32* (2006.01)
*G06K 15/00* (2006.01)
(52) U.S. Cl.
CPC ........... *H04N 2201/0046* (2013.01); *H04N 2201/0072* (2013.01); *H04N 2201/0094* (2013.01); *H04N 2201/0098* (2013.01)

JOB EXECUTION DEVICE FOR DISTRIBUTING THE PROCESS FOR EXECUTING THE JOB

Japanese Patent Application No. 2016-200955 filed on Oct. 12, 2016, including description, claims, drawings, and abstract the entire disclosure is incorporated herein by reference in its entirety.

BACKGROUND

Technological Field

The present invention relates to a job execution device which can distribute the process for executing the job between the job execution device and another device.

Description of the Related Art

In recent years, in an office or the like, a system in which a plurality of job execution devices, for example, a multi function peripheral having a plurality of functions, such as a copy function, a print function, a scan function, a facsimile function and the like, a device having only one function, such as a printer, a scanner, a facsimile device or the like, are connected via a network, is provided. In such a system, in case that a job for processing a large amount of data, such as a job for scanning numerous documents, a job for executing the broadcast communication for simultaneously transmitting the data to many destinations, and the like, is executed, it is preferable that the job is executed by distributing the process for executing the job to a plurality of job execution devices.

When a job is executed by distributing the process to a plurality of job execution devices, it is necessary to select the job execution device having the function which can execute the job. For example, in Japanese Patent Application Publication No. 2016-122331, the following system is disclosed. In this system, by transmitting the condition relating to the function required to execute the job, the priority condition and the like to a server, the server automatically selects the device which is suitable for the execution of the job.

As a method for distributing the process for executing the job for processing a large amount of data to a plurality of job execution devices, there is a primitive method in which a user oneself divides a job for processing a large amount of data into a plurality of jobs and enters the jobs obtained by dividing the job to a plurality of job execution devices. However, in this method, a troublesome work is required.

Further, when the process for executing the job is automatically distributed, as disclosed in Japanese Patent Application Publication No. 2016-122331, the server for distributing the process is required. Alternatively, it is necessary that an administrator previously carries out the complicated setting for the job execution device. Therefore, in a system in which the above-described server is not installed or a system in which an administrator does not carry out the complicated setting, it is difficult for a general user to distribute the process for executing the job by using a plurality of job execution devices. On the other hand, it is preferable to provide a job execution device having the high capacity corresponding to the capacity required to execute a job by distributing the process for executing the job to a plurality of devices. However, the cost for providing the job execution device is required.

SUMMARY

One of the objects of the present invention is to provide a job execution device in which a user can easily set the job distribution process.

To achieve at least one of the abovementioned objects, according to an aspect of the present invention, a job execution device reflecting one aspect of the present invention, comprises:

an operation panel having a display and an operation receiver;

a job executor for executing a job;

a communicator for communicating with another job execution device via a network; and a hardware processor that:

obtains information for displaying an operation window of the another job execution device and displays an operation window of the job execution device and the operation window of the another job execution device on the operation panel of the job execution device so as to arrange the operation window of the job execution device and the operation window of the another job execution device;

receives a setting of a distribution process for distributing a process for executing the job relating to a first function between the job execution device and the another job execution device by a predetermined operation, when a selection button of the first function exists in both of the operation window of the job execution device and the operation window of the another job execution device which are arranged and displayed on the operation panel; and instructs the job executor of the job execution device and the another job execution device to carry out the distribution process for distributing the process for executing the job relating to the first function, when an entry of the job relating to the first function is received in a situation in which the distribution process for distributing the process for executing the job relating to the first function is set.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF PREFERRED EMBODIMENT

Hereinafter, one or more embodiments of the present invention will be described with reference to the drawings. However, the scope of the invention is not limited to the disclosed embodiments.

Figure 1:
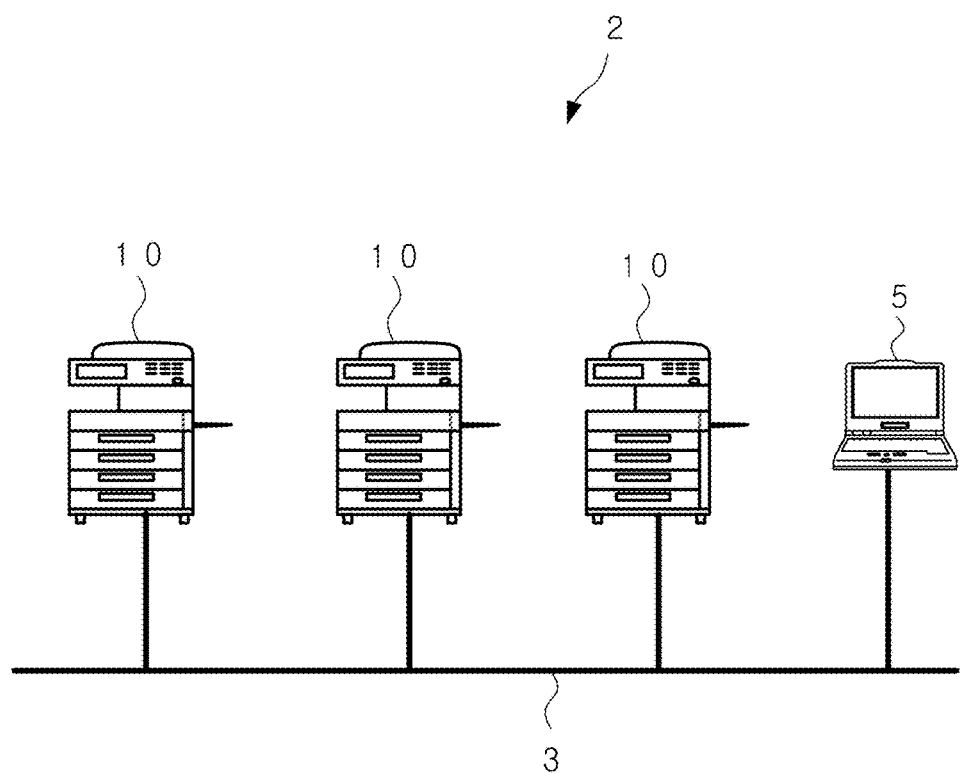
FIG. 1 is a view showing an example of the image forming system including a plurality of job execution devices according to the embodiment.

FIG. 1 is a view showing an example of the image forming system 2 including a plurality of job execution devices according to the embodiment. In the image forming system 2, a plurality of multi function peripherals 10 as job execution devices are connected with each other via a network 3, such as LAN (Local Area Network) or the like. Further, a terminal device 5, such as a personal computer or the like, which is used by a user is connected via the network 3.

The multi function peripheral 10 is an image forming apparatus which has a copy function for obtaining image data by optically reading an original using a scanner to print out the image of the original on a recording sheet in accordance with the obtained image data, a scan function for storing the image data obtained by optionally reading an original using a scanner as a file or the like and transmitting the image data to an external terminal, a print function for printing out an image on a recording sheet in accordance with the print data received from the terminal device 5 or the like, a facsimile function for transmitting/receiving the image data in accordance with the facsimile communication protocol, and the like, and which executes the job relating to each function. Hereinafter, the multi function peripheral 10 is also referred to as MFP.

One multi function peripheral 10 can distribute the process for executing the job entered therein to one or more other multi function peripherals 10 which are connected with one multi function peripheral 10 via the network 3. The distribution of the process for executing the job (the distribution process) can be easily set via the operation panel of one multi function peripheral 10.

Figure 2:
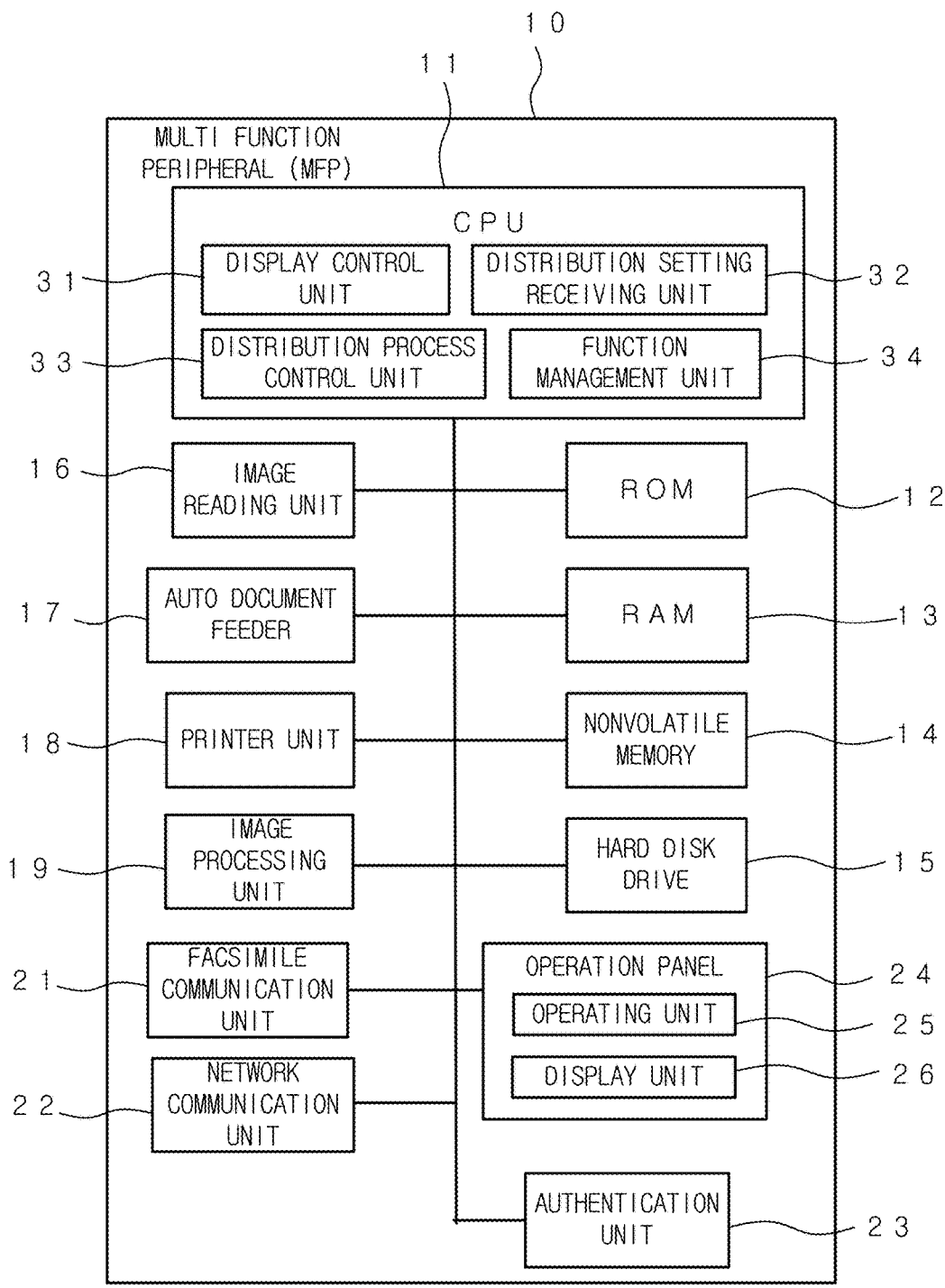
FIG. 2 is a block diagram showing the schematic configuration of the multi function peripheral.

FIG. 2 is a block diagram showing the schematic configuration of the multi function peripheral 10. The multi function peripheral 10 comprises a CPU (Central Processing Unit) 11 for entirely controlling the multi function peripheral 10. The CPU 11 is connected with a ROM (Read Only Memory) 12, a RAM (Random Access Memory) 13, a nonvolatile memory 14, a hard disk drive 15, an image reading unit 16, an auto document feeder 17, a printer unit 18, an image processing unit 19, a facsimile communication unit 21, a network communication unit 22, an authentication unit 23, an operation panel 24 and the like via a bus.

By the CPU 11, a middleware, application programs and the like are executed on an OS (Operating System) program as a base. In the ROM 12 and the hard disk drive 15, various types of programs are stored. By executing various types of processes by the CPU 11 in accordance with these programs, each function of the multi function peripheral 10 is realized.

The RAM 13 is used as a work memory for temporarily storing various data when the CPU 11 executes the process in accordance with the programs, and as an image memory for storing the image data, and the like.

The nonvolatile memory 14 is a memory (flash memory) in which the stored contents are not damaged even if the multi function peripheral 10 is turned off, and is used for storing various types of settings. The hard disk drive 15 is a large-capacity nonvolatile memory device. In the hard disk drive 15, various types of application programs and data are stored in addition to print data, image data, and the like.

The image reading unit 16 has the function for obtaining image data by optically reading an image of an original. For example, the image reading unit 16 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The auto document feeder 17 has the function for conveying the original by feeding the original set to the original setting tray from the top sheet one by one, passing the original through the reading position of the image reading unit 16 and discharging the original to a predetermined discharge position. The image reading unit 16 has the function for reading the original set on a platen glass, and has the function for sequentially reading the original which is conveyed by the auto document feeder 17.

The printer unit 18 has the function for forming an image on the recording sheet in accordance with the image data. In this embodiment, the printer unit 18 is configured as a so-called laser printer which comprises a conveying device for the recording sheet, a photoconductive drum, a charging device, a laser unit, a developing device, a transfer and separation device, a cleaning device and the fixing device, and which forms an image by the electrophotographic process. Alternatively, an image may be formed by another type of printer.

The image processing unit 19 carries out the rasterizing process for converting print data into image data, the compression/decompression process for the image data, and the like in addition to the processings, such as the enlargement/reduction or the rotation of image data.

The facsimile communication unit 21 has the function for transmitting and receiving the image data to/from an external facsimile device via a public line in accordance with the facsimile communication protocol. The image reading unit 16, the auto document feeder 17, the printer unit 18, the image processing unit 19, the facsimile communication unit 21 function as the job execution unit (job executor) for executing various types of jobs relating to the copy function, the print function, the scan function, the facsimile function and the like.

The network communication unit 22 (communicator) has the function for executing the data communication with other multi function peripherals 10, the terminal device 5, another external device and the like via the network 3.

The authentication unit 23 (authenticator) has the function for authenticating a user who will use the multi function peripheral 10. A user may be authenticated by manually entering a password, an ID and the like, the vein authentication, the authentication using the mobile terminal, or the like.

The operation panel 24 comprises an operating unit 25 and a display unit 26. The display unit 26 has the function for displaying various types of operation windows, setting windows and the like, and comprises a liquid crystal display or the like. The operating unit 25 (operation receiver) receives various types of operations from a user, and comprises various types of hardware keys, such as a start button, a numeric keypad and the like, and a touch screen provided on the display surface of the display unit 26. The touch screen detects the coordinate position on which the touch screen is pressed down by a touch pen, a user's finger or the like. Further, the touch screen detects a flick operation, a drag operation, a drag & drop operation and the like.

The CPU 11 of one multi function peripheral 10 has the function as the display control unit 31, the distribution setting receiving unit 32, the distribution process control unit 33 and the function management unit 34 by executing the programs. The display control unit 31 has the function for obtaining the information for displaying the operation window of another multi function peripheral 10, and arranging and displaying the operation window of the above one multi function peripheral 10 and the operation window of another multi function peripheral 10 on the operation panel 24 of the above one multi function peripheral 10. The display control unit 31 has a so-called Web panel function for obtaining the information relating to the function of another multi function peripheral 10 and creates the operation window of another multi function peripheral 10 in accordance with the obtained information.

When the selection button for selecting the same function exists in both of the operation window of the above one multi function peripheral 10 and the operation window of another multi function peripheral 10 which are arranged and displayed on the operation panel 24, the distribution setting receiving unit 32 sets the above one multi function peripheral 10 to the distribution process mode for distributing the process for executing the job relating to the function corresponding to the select button to the above one multi function peripheral 10 and another multi function peripheral 10 by receiving the predetermined operation for the selection button from a user.

In case that the entry of the job relating to the predetermined function is received in the situation in which the distribution process for distributing the process for executing the job relating to the predetermined function is set, the distribution process control unit 33 controls the above one multi function peripheral 10 and another multi function peripheral 10 so as to distribute the process for executing the entered job between the above one multi function peripheral 10 and another multi function peripheral 10. For example, the entered job is divided into the first job to be executed by the above one multi function peripheral 10 and the second job to be executed by another multi function peripheral 10. The first job is executed by the above one multi function peripheral 10 and the second job is transmitted to another multi function peripheral 10 to instruct another multi function peripheral 10 to execute the second job.

The function management unit 34 manages the functions of the above one multi function peripheral 10. The function management unit 34 transmits the function information indicating the functions of the above one multi function peripheral 10 to another multi function peripheral 10. Another multi function peripheral 10 which receives the function information prepares and displays the operation window of the above one multi function peripheral 10 in accordance with the received function information. One multi function peripheral 10 may display the operation window of another multi function peripheral 10 by receiving the window data of the operation window of another multi function peripheral 10 from another multi function peripheral 10.

Figure 3:
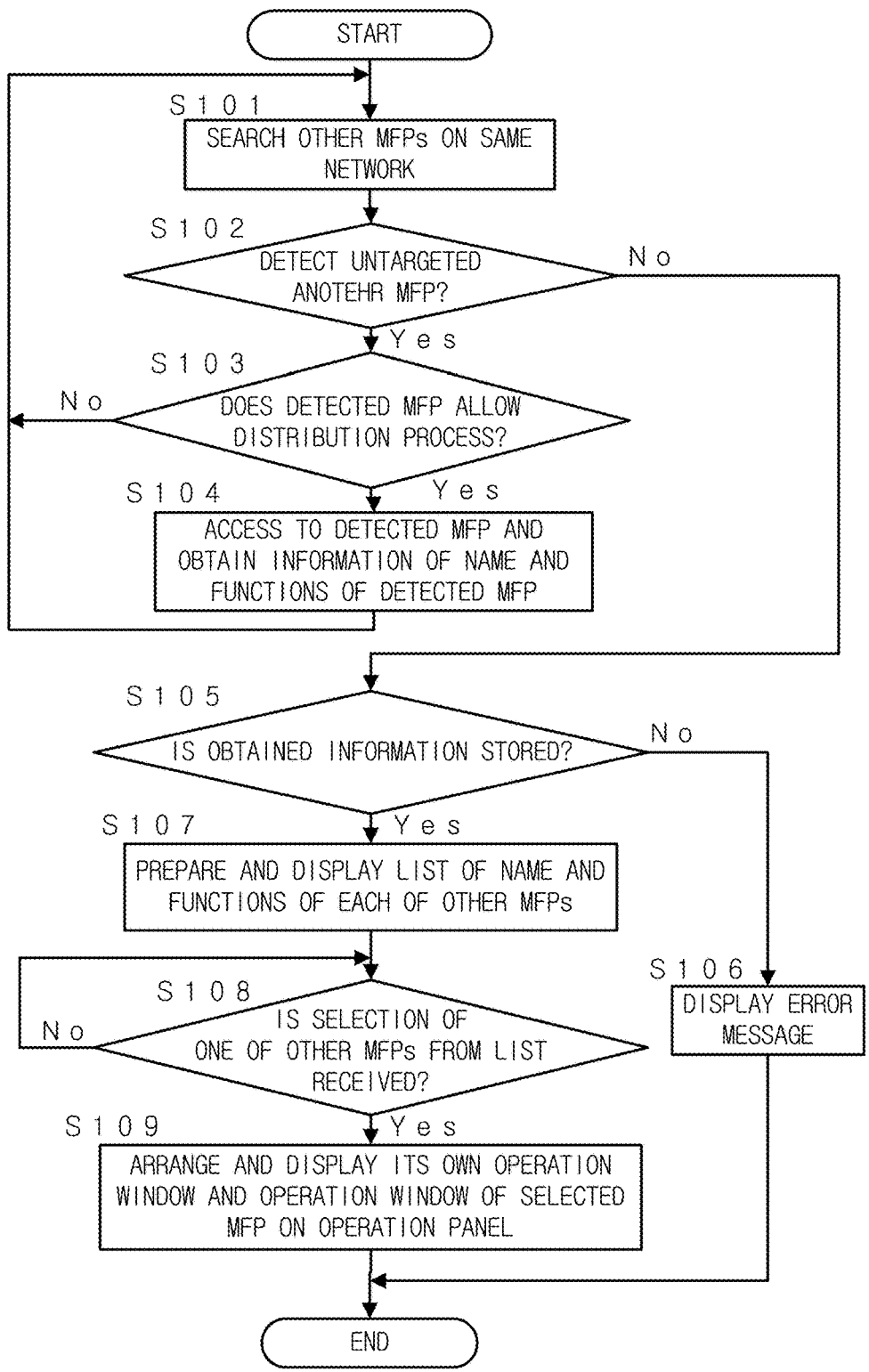
FIG. 3 is a flowchart showing the process for searching other multi function peripherals which are connected with one multi function peripheral on the network and for receiving the selection of one or more multi function peripherals for carrying out the distribution process with one multi function peripheral among the searched multi function peripherals.

FIG. 3 is the flowchart showing the process for searching other multi function peripherals 10 which are connected with one multi function peripheral on the network 3 and for receiving the selection of one or more multi function peripherals 10 for carrying out the distribution process with one multi function peripheral 10 among the searched multi function peripherals 10. This process is carried out when the setting request for setting the multi function peripheral 10 to carry out the distribution process is received from a user.

Firstly, the CPU 11 of one multi function peripheral 10 searches other multi function peripherals 10 (MFPs) on the network 3 (Step S101). When other multi function peripherals 10 which have not been targeted (not processed) in this process are detected (Step S102; Yes), the CPU 11 targets one of the detected multi function peripherals 10 and judges whether the targeted multi function peripheral 10 allows the distribution process (Step S103). When the multi function peripheral 10 is detected, the information for accessing to the detected multi function peripheral 10 (IP address or the like) is obtained.

When the targeted multi function peripheral 10 allows the distribution process (Step S103; Yes), one multi function peripheral 10 accesses to the targeted multi function peripheral 10 and obtains the information indicating the name and the functions of the targeted multi function peripheral 10 to store the obtained information therein (Step S104). Then, the process returns to Step S101. In case that the targeted multi function peripheral 10 does not allow the distribution process (Step S103; No), the process returns to Step S101.

In case that no multi function peripheral 10 which has not been targeted is detected (Step S102; No), that is, in case that there is no other multi function peripheral 10 on the network 3 or in case that all of the multi function peripherals 10 which are detected on the network 3 have been targeted (Step S102; No), it is checked whether the information indicating the name and the functions of each of the other multi function peripherals 10 which allow the distribution process is stored at Step S104 (Step S105).

In case that the information indicating the name and the functions of each of the other multi function peripherals 10 which allow the distribution process is not stored (Step S105; No), because there is no other multi function peripheral 10 which allows the distribution process, one multi function peripheral 10 displays an error message (Step S106). Then the process is ended.

In case that the information indicating the name and the functions of each of the other multi function peripherals 10 which allow the distribution process is stored (Step S105; Yes), one multi function peripheral 10 prepares a list of the name of the functions of each of the other multi function peripherals 10 which allow the distribution process and displays the prepared list on the operation panel 24 (Step S107). When the operation for selecting one of the other multi function peripherals 10 from the list is received from a user (Step S108; Yes), one multi function peripheral 10 arranges and displays its own operation window and the operation window of the multi function peripheral 10 selected at Step S108 on the operation panel 24 (Step S109). Then, the process is ended.

One multi function peripheral 10 may automatically select one of the other multi function peripherals 10 on the network 3 as the multi function peripheral 10 which carries out the distribution process with one multi function peripheral 10.

Figure 4:
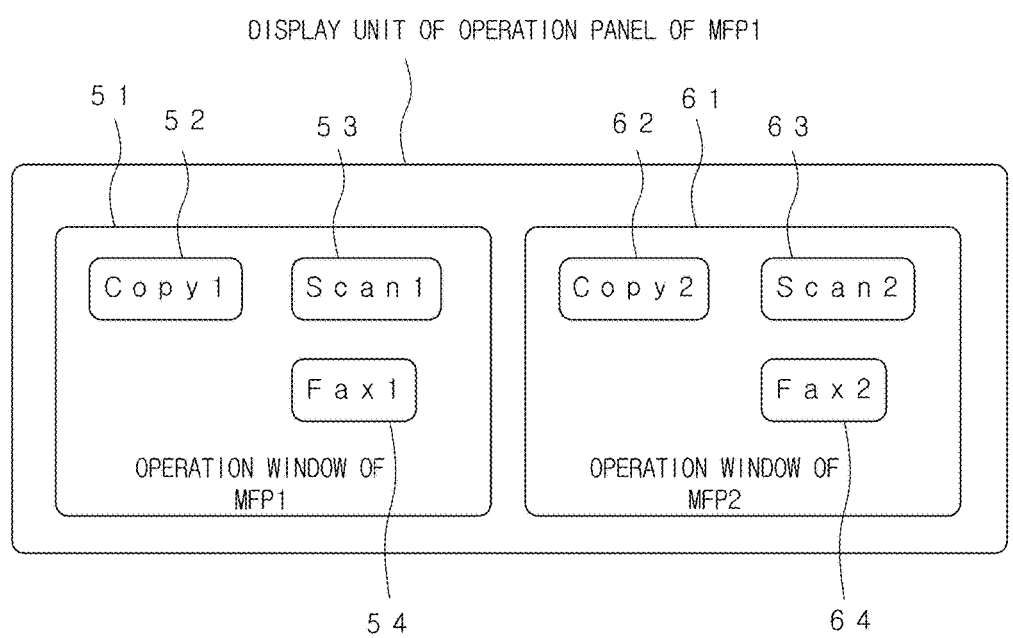
FIG. 4 is a view showing an example of the situation in which the operation window of MFP1 and the operation window of MFP2 are arranged and displayed on the operation panel of MFP1.

FIG. 4 shows an example of the situation in which the operation window 51 of MFP1 and the operation window 61 of MFP2 are arranged and displayed on the operation panel 24 of MFP1. In the operation window 51 of MFP1, the selection button 52 of the copy function (Copy1), the selection button 53 of the scan function (Scan1) and the selection button 54 of the facsimile function (Fax1) are displayed. Further, in the operation window 61 of MFP2, the selection button 62 of the copy function (Copy2), the selection button 63 of the scan function (Scan2) and the selection button 64 of the facsimile function (Fax2) are displayed. Each selection button is an icon.

Figure 5:
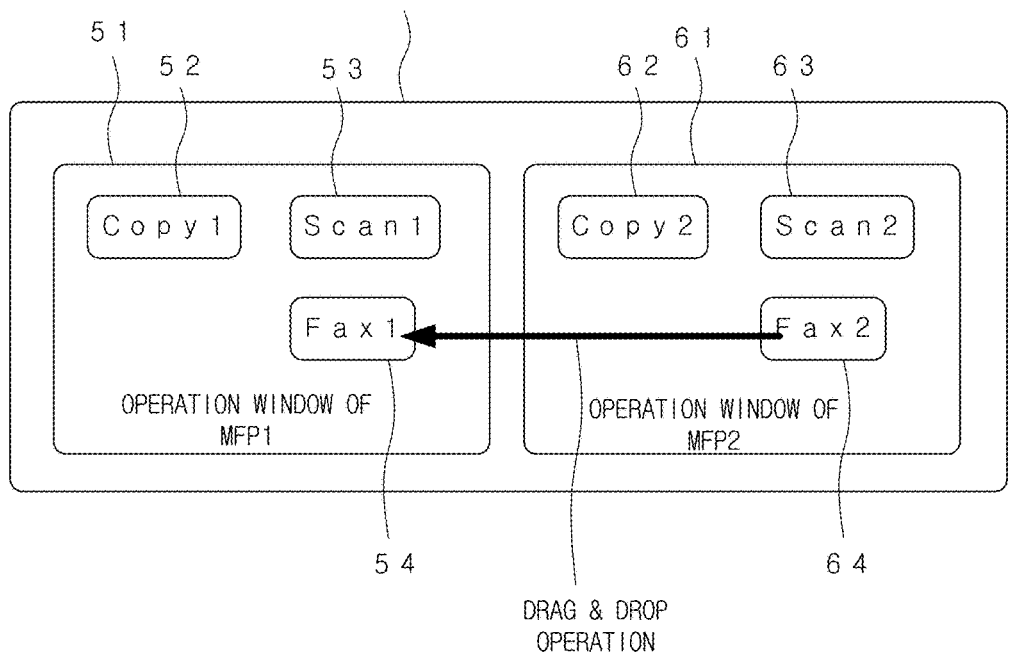
FIG. 5 is a view showing the situation in which the setting operation for the distribution process is received from a user via the operation panel.
Figure 6:
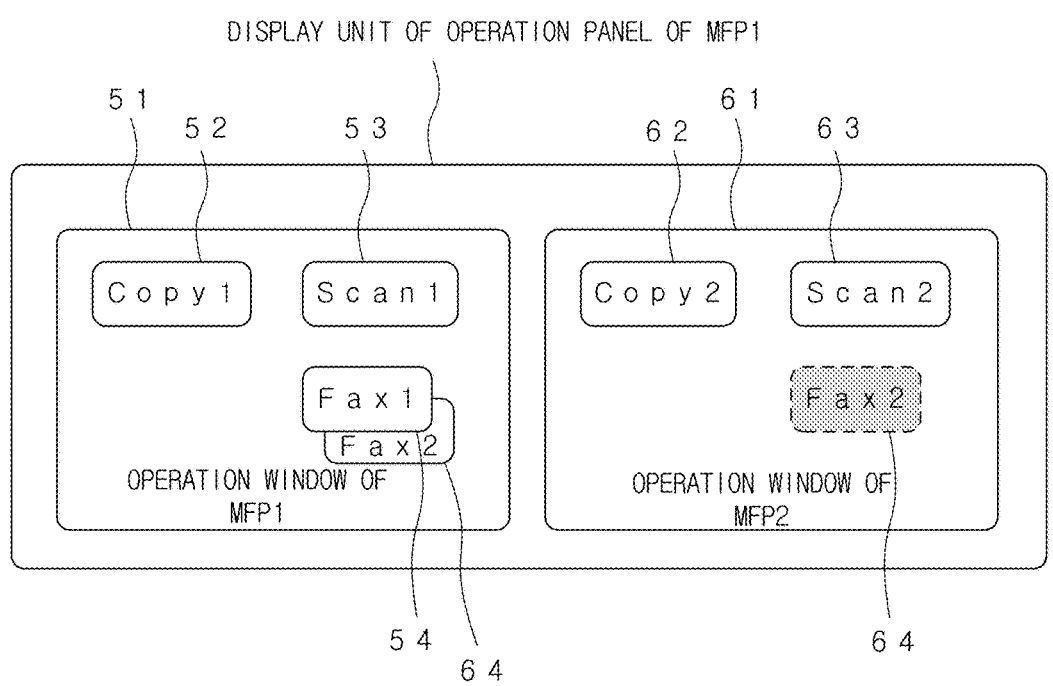
FIG. 6 is a view showing the display situation of the operation panel after the operation shown in FIG. 5 is received (after the setting of the distribution process)

FIG. 5 shows the situation in which the setting operation for the distribution process is received from a user via the operation panel 24. FIG. 6 shows the display situation of the operation panel 24 after the setting operation is received (after the setting of the distribution process). In the example of FIG. 5, a user carries out the drag & drop operation for the selection button 64 of the facsimile function (Fax2) displayed in the operation window 61 of MFP2. Specifically, a user touches the selection button 64 of the facsimile function (Fax2) by using a user's finger, and moves (drags) the selection button 64 to the selection button 54 of the facsimile function (Fax1) displayed in the operation window 51 of MFP1 in the situation in which the selection button 64 is touched by the user's finger. Then, the user carries out the operation (drop) for releasing the user's finger from the selection button 64.

In accordance with the drag & drop operation, the icon of the selection button 64 of the facsimile function (Fax2) is moved and the display contents are changed to the situation shown in FIG. 6. That is, the selection button 64 of the facsimile function (Fax2) is displayed so as to overlap a part of the selection button 64 with a part of the selection button 54 of the facsimile function (Fax1) in the operation window 51 of MFP1. In the operation window 61 of MFP2, the selection button 64 of the facsimile function (Fax2) is grayed out or is deleted. As a result, a user cannot carry out the operation for the selection button 64 of the facsimile function (Fax2) in the operation window 61 of MFP2.

Only in case that the operation button (icon) of the same function exists in both the operation window 51 of MFP1 and the operation window 61 of MFP2, it is possible to set the distribution process for the above same function. For example, in case that the selection button 54 of the facsimile function does not exist in the operation window 51 of MFP1, even though a user attempts to move the selection button 64 of the facsimile function to the operation window 51 of MFP1 from the operation window 61 of MFP2 by the drag & drop operation, the operation is refused or invalidated.

In the multi function peripheral 10 according to the embodiment, only by carrying out such a drag & drop operation, the setting of the distribution process for distributing the process for executing the facsimile job entered in MFP1 to MFP1 and MFP2, is finished. The display form in which the selection button 54 of the facsimile function (Fax1) and the selection button 64 of the facsimile function (Fax2) are displayed when the setting of the distribution process is finished, is not limited to the display form in which the a part of the selection button 54 is overlapped with a part of the selection button 64. For example, the selection button 54 and the selection button 64 may be displayed so as to arrange them, or may be displayed by changing the color of the selection button 54 and the color of the selection button to the same specific color.

Figure 7:
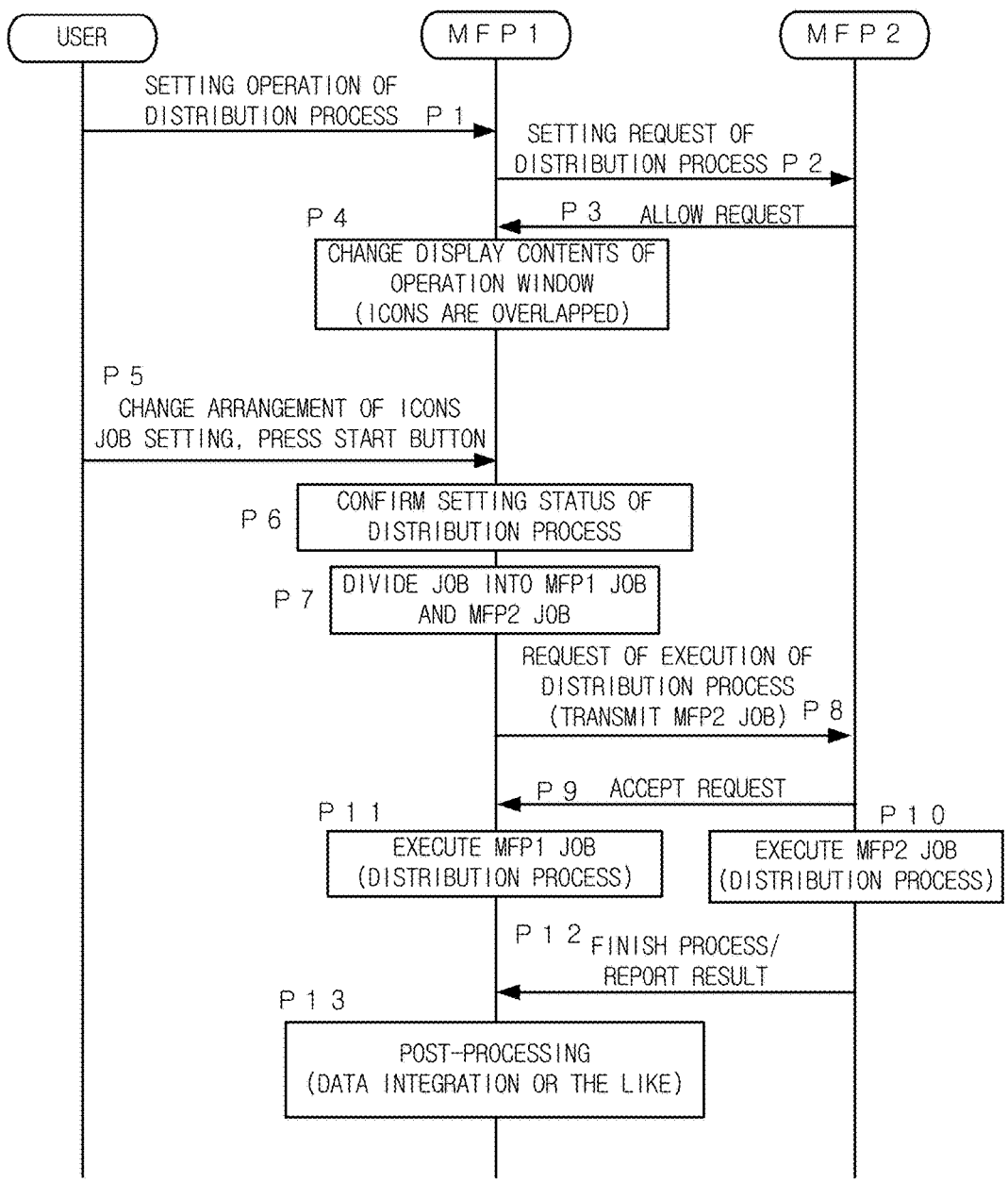
FIG. 7 is a sequence diagram showing the operation which is carried out from the setting of the distribution process to the distribution of the process for executing the job.

FIG. 7 is a sequence diagram showing the operation which is carried out from the setting of the distribution process to the distribution of the process for executing the job. In this embodiment, it is assumed that MFP2 is set to the multi function peripheral 10 which carries out the distribution process with MFP1 and the window shown in FIG. 4 is displayed on the operation panel 24 of MFP1.

Firstly, a user carries out the setting operation for setting the distribution process by the drag & drop operation shown in FIG. 5 (P1). MFP1 which receives the drag & drop operation transmits the setting request of the distribution process for the function for which the setting operation of the distribution process is carried out (in this case, the facsimile function), to MFP2 (P2). MFP2 judges whether to allow the received setting request. When the setting request is allowed, MFP2 transmits the response indicating that the setting request is allowed, to MFP1 which transmits the setting request (P3). For example, in case that MFP2 can immediately execute the job relating to the facsimile function, MFP2 allows the setting request of the distribution process. In case that MFP2 cannot immediately execute the job relating to the function for which the setting operation of the distribution process is carried out, such as in case that MFP2 currently executes another job relating to the facsimile function, MFP2 rejects the setting request of the distribution process.

When MFP2 allows the setting request of the distribution process for the function for which the setting operation of the distribution process is carried out, MFP2 does not accept the entry of the job relating to this function by displaying the message indicating that this function is currently provided for MFP1 or by graying out the operation button relating to this function in MFP2. Then, MFP2 is operated so as not to use this function in MFP2.

MFP1 which receives the response indicating that the setting request is allowed from MFP2, changes the display contents of the operation panel 24 to the contents shown in FIG. 6 (the situation in which the distribution process is set) (P4). Then, a user carries out the operation for changing the arrangement of the icon as described below, the operation for entering the job, the operation for instructing MFP1 to execute the entered job or the like, for the operation window 51 of MFP1, which is displayed on the operation panel 24 (P5).

When MFP1 receives the operation for entering the job and the operation for instructing MFP1 to execute the entered job from a user, MFP1 confirms the setting status of the distribution process (P6). Further, MFP1 divides the entered job into the job to be executed in MFP1 (referred to as MFP1 job) and the job to be executed in MFP2 (referred to as MFP2 job) in accordance with the setting status of the distribution process (P7). The setting status of the distribution process will be explained below.

MFP1 transmits the MFP2 job and the request of the execution of the distribution process to MFP2 (P8). MFP2 which receives the MFP2 job and the like, judges whether to execute the MFP2 job in accordance with the request of the execution of the distribution process. When MFP2 executes the MFP2 job, MFP2 transmits the response indicating the MFP2 job is accepted, to MFP1 (P9). Then, MFP2 executes the MFP2 job received from MFP1 (P10).

MFP1 which receives the response indicating the MFP2 job is accepted, executes the MFP1 job (P11).

When MFP2 finishes the execution of the MFP2 job, MFP2 transmits the report indicating the finish of the execution of the MFP2 job and the execution result to MFP1 (P12). MFP1 which finishes the execution of MFP1 job and receives this report from MFP2, carries out the post-processing, such as the integration of the execution result and the like, as necessary (P13). Thereby, a series of the distribution process is finished.

Next, the setting status of the distribution process will be explained. In this case, the contents (setting status) of the distribution process are changed according to the positional relation, the overlapping order, the size relation, the size ratio of the icon moved from the operation window of another multi function peripheral 10 (MFP2) to the operation window of one multi function peripheral (MFP1) and the icon which is originally displayed in the operation window of one multi function peripheral (MFP1). Further, the overlapping order, the positions, the sizes of the displayed icons can be optionally changed by the user's operation.

Figure 8A:
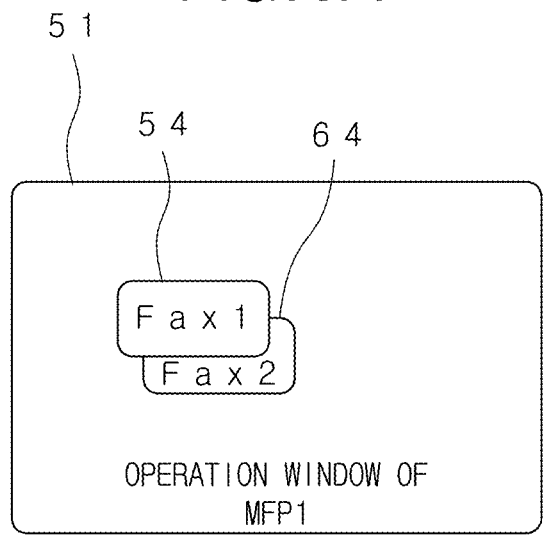
FIGS. 8A and 8B are views showing an example of the situation in which the multi function peripheral to be preferentially used for the execution of the job is changed in accordance with the overlapping order of the icons.
Figure 8B:
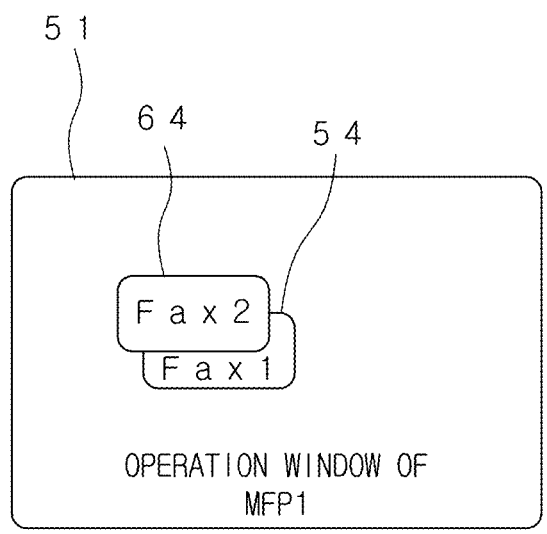

FIGS. 8A and 8B show an example of the situation in which the multi function peripheral 10 to be preferentially used for the execution of the job is changed in accordance with the overlapping order of the icons. In this example, the facsimile transmission is explained.

As shown in FIG. 8A, in case that the selection button 54 of the facsimile function (Fax1) is overlapped on the selection button 64 of the facsimile function (Fax2), MFP1 is preferentially used for the execution of the facsimile job. On the other hand, as shown in FIG. 8B, in case that the selection button 64 of the facsimile function (Fax2) is overlapped on the selection button 54 of the facsimile function (Fax1), MFP2 is preferentially used for the execution of the facsimile job.

For example, in case of the facsimile broadcast transmission, in either the situation of FIG. 8A or the situation of FIG. 8B, the data is transmitted by MFP1 and MFP2 simultaneously and in parallel in accordance with the distribution process. MFP1 is operated like MFP having a plurality of communication lines.

On the other hand, even though the distribution process for the facsimile function is set, when a facsimile job for transmitting the data to one destination is entered, it is sufficient that only one of MFP1 and MFP2 transmits the data. In this case, the multi function peripheral 10 to be preferentially used for the facsimile transmission is determined in accordance with the overlapping order of the icons. In case of FIG. 8A, the facsimile transmission to one destination is executed by using MFP1. In case of FIG. 8B, the facsimile transmission to one destination is executed by using MFP2.

Figure 9A:
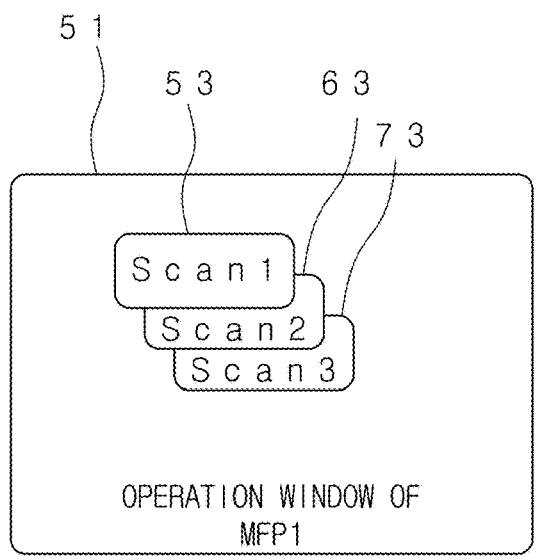
FIGS. 9A and 9B are views showing an example of the situation in which the device for integrating the data obtained by the distribution process and/or the data integration order in which the data obtained by the distribution process are integrated are changed in accordance with the overlapping order of the icons.
Figure 9B:
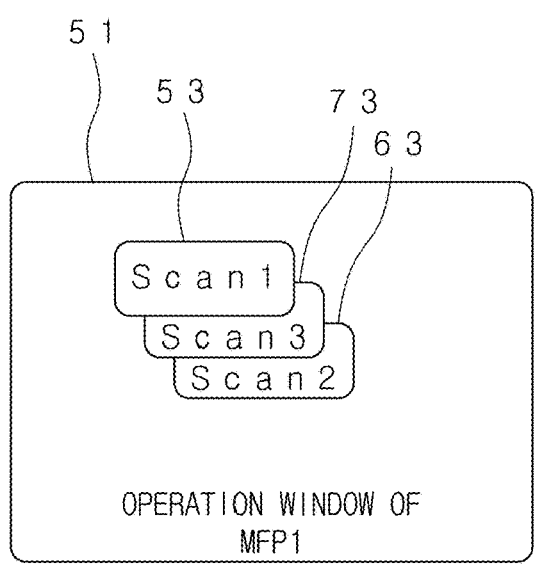

FIGS. 9A and 9B show an example of the situation in which the device for integrating the data obtained by the distribution process and/or the data integration order in which the data obtained by the distribution process are integrated are changed in accordance with the overlapping order of the icons.

For example, in case of the scan job, the original is divided and set to MFP1 and MFP2. Then, by scanning the original by MFP1 and MFP2 simultaneously in accordance with the distribution process, the scanning of the original can be finished for a short time. In this case, it is necessary to collect the image data obtained by scanning the original by MFP1 and MFP2 into one MFP and integrate the collected image data. In FIGS. 9A and 9B, the MFP into which the image data obtained by scanning the original by MFP1 and MFP2 are collected, and the data integration order in which the image data of the original scanned by MFPs are integrated are changed in accordance with the overlapping order of the icons.

For example, as shown in FIG. 9A, in case that the icons 53, 63 and 73 for the scan function are overlapped in the order of MFP1, MFP2 and MFP3 from the top, the result (data) obtained by scanning a part of the original by MFP1, the result (data) obtained by scanning a part of the original by MFP2 and the result (data) obtained by scanning a part of the original by MFP3 are integrated in this order. As shown in FIG. 9B, in case that the icons 53, 73 and 63 for the scan function are overlapped in the order of MFP1, MFP3 and MFP2 from the top, the result (data) obtained by scanning a part of the original by MFP1, the result (data) obtained by scanning a part of the original by MFP3 and the result (data) obtained by scanning a part of the original by MFP2 are integrated in this order.

Further, the file obtained by integrating the data is stored in the storing unit of MFP displayed on the top icon (Scan To HDD or the like), or is transmitted from the communication unit of MFP displayed on the top icon to an external device (Scan To Email or the like).

Figure 10A:
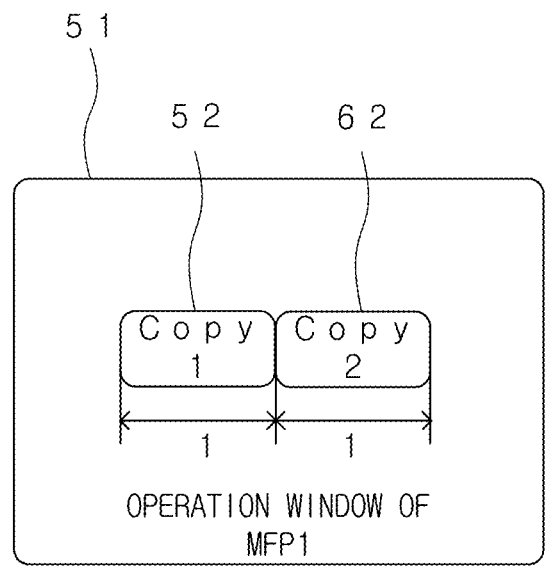
FIGS. 10A and 10B are views showing an example in which the distribution ratio between one multi function peripheral and the other multi function peripheral is changed in accordance with the ratio of the size of each icon.
Figure 10B:
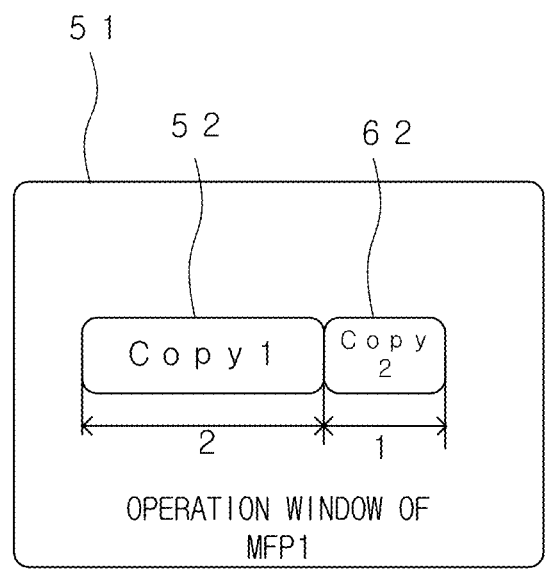

FIGS. 10A and 10B show an example in which the distribution ratio of the process for executing the job between one multi function peripheral 10 and the other multi function peripheral 10 is changed in accordance with the ratio of the size of each icon. In the example of FIGS. 10A and 10B, the distribution process for distributing the process for executing the copy job is explained.

The size of each icon can be changed by the operation, such as a pinch-in/pinch-out operation or the like. In this example, the ratio of the number of copies which are executed by each MFP is changed in accordance with the ratio of the longitudinal length of each icon. In FIG. 10A, the ratio of the longitudinal length between the icon 52 of Copy1 and the icon 62 of Copy2 is 1:1. In this case, when 30 copies are executed by MFP1 and MFP2, the contents of the distribution process are set so as to output 15 copies by MFP1 and output 15 copies by MFP2. In FIG. 10B, the ratio of the longitudinal length between the icon 52 of Copy1 and the icon 62 of Copy2 is 2:1. In this case, when 30 copies are executed by MFP1 and MFP2, the contents of the distribution process are set so as to output 20 copies by MFP1 and output 10 copies by MFP2.

Because it is difficult to precisely set the size ratio by a pinch-in/pinch-out operation when the size of each icon is changed, for example, a user may designate the size ratio by entering the specific value. Further, MFP may assist a user to set the size ratio, for example, by displaying the size ratio or the expected number of copies on the operation panel 24.

Further, a plurality of elements, such as the overlapping order of the icons, the size ratio and the like, may be combined.

Figure 11:
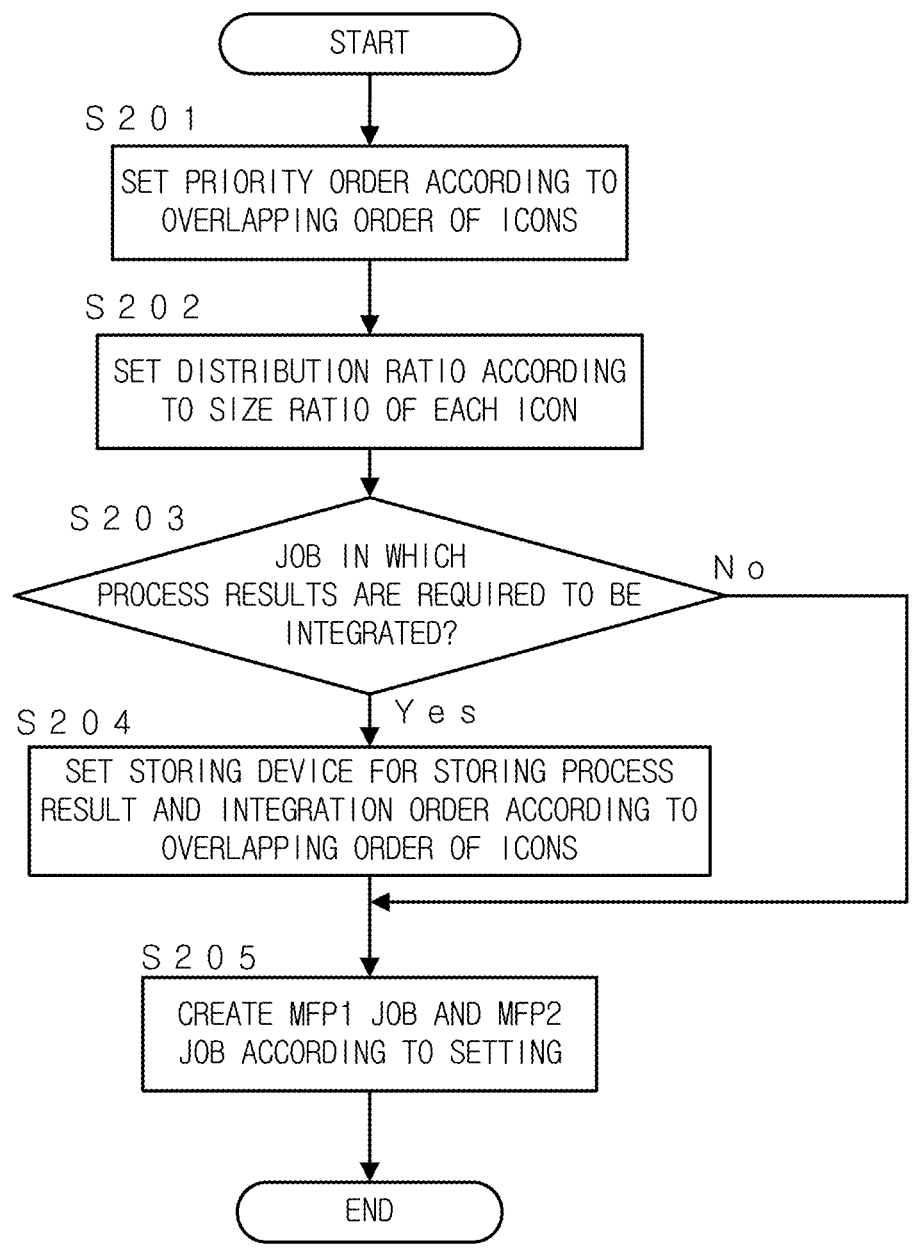
FIG. 11 is a flowchart showing the detailed process of P6 and P7 shown in FIG. 7, which is carried out by the multi function peripheral.

FIG. 11 is a flowchart showing the detailed process of P6 and P7 shown in FIG. 7, which is carried out by the multi function peripheral 10. Firstly, MFP1 checks the overlapping order of the icons, and sets the priority order to MFP2 which carries out the distribution process with MFP1 (Step S201). Next, MFP1 sets the distribution ratio of the process for executing the job is set according to the size ratio of each icon (Step S202). MFP1 judges whether the entered job is a job in which the results obtained by executing the job by MFPs are required to be integrated (Step S203). In case of the job in which the results are required to be integrated (Step S203; Yes), MFP1 sets the integration order of the results obtained by executing the job, the storing device for storing the integrated result and the like, in accordance with the overlapping order of the icons (Step S204).

MFP1 creates the MFP1 job and the MFP2 job for carrying out the distribution process for distributing the process for executing the entered job, in accordance with the setting status of the distribution process which is set according to the overlapping order, the size ratio of each icon and the like as described above (Step S205). Then, the process is ended.

Next, the diversion of the authentication information and the authentication result will be explained.

There are some cases in which the multi function peripheral 10 requires the user authentication when the multi function peripheral 10 receives an operation from a user. In this case, MFP1 stores the authentication information and the authentication result when MFP1 carries out the user authentication. In the first process for instructing MFP2 to carry out the distribution process, that is, when the operation window of MFP2 is displayed on the operation panel 24 of MFP1 so as to arrange the operation window of MFP2 and the operation window of MFP1, in case that MFP2 also requires the user authentication, MFP2 carries out the user authentication by using the authentication information which is stored at the user authentication carried out by MFP1. Specifically, MFP1 transmits the authentication information and/or the authentication result stored therein to MFP2. Then, MFP2 which receives the authentication information and the like, carries out the user authentication by using the authentication information and/or the authentication.

Figure 12:
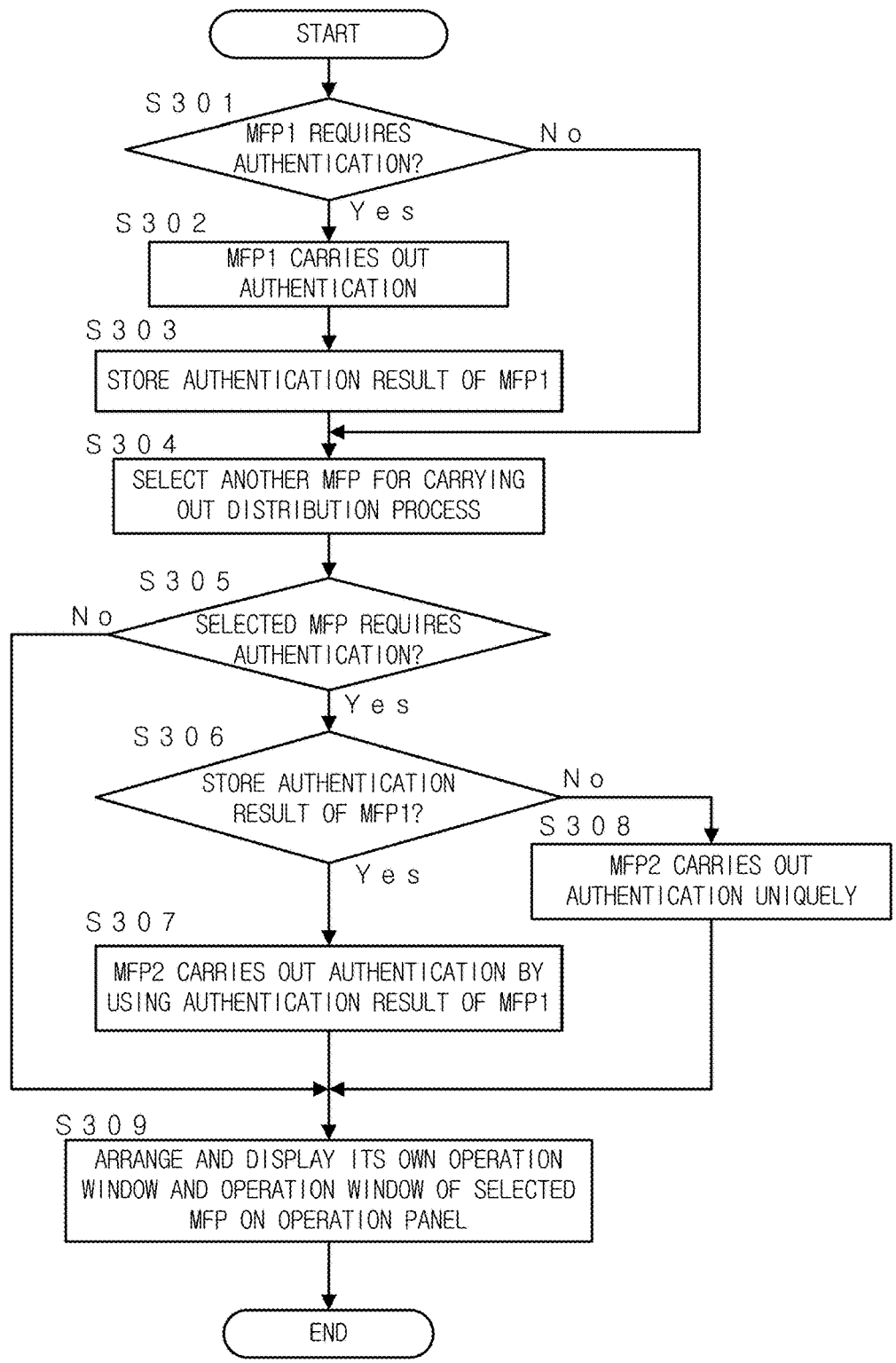
FIG. 12 is a flowchart showing the operation relating to the authentication.

FIG. 12 is a flowchart showing the operation relating to the above-described authentication. It is checked whether MFP1 requires the user authentication (Step S301). In case that the user authentication is not required (Step S301; No), the process proceeds to Step S304. In case that the user authentication is required (Step S301; Yes), MFP1 carries out the user authentication (Step S302). MFP1 stores the authentication information received from a user at the user authentication and/or the authentication result therein (Step S303). Then, the process proceeds to Step S304.

At Step S304, the selection of another multi function peripheral 10 which carries out the distribution process with MFP1 is received from a user. Then, it is checked whether the selected multi function peripheral 10 (MFP2) requires the user authentication (Step S305). In case that the selected multi function peripheral 10 (MFP2) does not require the user authentication (Step S305; No), the process proceeds to Step S309. In case that the selected multi function peripheral 10 (MFP2) requires the user authentication (Step S305; Yes), MFP1 checks whether the authentication information and/or the authentication result is stored therein (Step S306).

In case that the authentication information and the authentication result is stored in MFP1 (Step S306; Yes), MFP2 carries out the user authentication by using the authentication information and/or the authentication result stored in MFP1 (Step S307). Then, the process proceeds to Step S309. Specifically, MFP1 transmits the stored authentication information and/or the stored authentication result to MFP2. MFP2 which receives the authentication information and/or the authentication result carries out the user authentication in accordance with the received authentication information and/or the received authentication result.

In case that the authentication information and/or the authentication result is not stored in MFP1 (Step S306; No), MFP2 carries out the user authentication uniquely (Step S308). Then, the process proceeds to Step S309.

At Step S309, MFP1 arranges and displays the operation window of MFP1 and the operation window of MFP2 on the operation panel 24 of MFP1. Then, the process is ended.

As described above, in the multi function peripheral 10 according to the embodiment, its own operation window and the operation window of another multi function peripheral 10 are arranged and displayed on its own operation panel 24. Only by moving the icon which exists in the operation window of another multi function peripheral 10 to its own operation window by a drag & drop operation, it is possible to finish the setting of the distribution process for distributing the process for executing the job relating to the function corresponding to the moved icon. As a result, it is possible to carry out the distribution process for a plurality of multi function peripherals 10 by a simple operation without providing a special server or without carrying out the previous setting by an administrator.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In this embodiment, a drag & drop operation is carried out for an icon as the predetermined operation for setting the distribution process. However, the operation except the drag & drop operation can be carried out as the predetermined operation for setting the distribution process. For example, in the situation in which the selection button 52 of the copy function is selected in the operation window 51 of MFP1, when the selection button 62 of the copy function is selected in the operation window 61 of MFP2, the distribution process for the copy function to be carried out by MFP1 and MFP2 may be set.

In this embodiment, the priority order of the device, the integration order, the storing device for storing the integrated result and the like are set in accordance with the overlapping order of the icons. However, the priority order and the like may be set in accordance with the positional relation of the icons, the arrangement order of the icons or the like. For example, in case that the icons are arranged in a row, the priority order of the device corresponding to the icon arranged at the right end of the row may be set the highest.

In this embodiment, the multi function peripheral 10 is explained as an example of the job execution device. The job execution device is not limited to this, and may be an optional device for executing a job, such as a printer, a scanner, a facsimile device, a copier and the like.

In this embodiment, the operation window of one job execution device and the operation window of another job execution device are displayed on the operation panel of one job execution device so as to arrange them. In case that the selection button of the first function exists in both of the operation window of one job execution device and the operation window of another job execution device, the setting of the distribution process for distributing the process for executing the job relating to the first function between one job execution device and another job execution device is received by the predetermined operation.

In this embodiment, by moving the icon of the first function, which is displayed in the operation window of another job execution device, to the operation window of one job execution device, the distribution process for distributing the process for executing the job relating to the first function and entered in one job execution device between one job execution device and another job execution device is set.

In this embodiment, the content of the distribution process (how to distribute the process for executing the job, or the like) is changed in accordance with the positional relation, for example, the overlapping order, the arrangement order or the like, of the icon of the first function, which is moved from the operation window of another job execution device to the operation window of one job execution device, and the icon of the first function, which is originally displayed in the operation window of one job execution device.

In this embodiment, the job execution device to be preferentially used for the execution of the job is changed in accordance with the overlapping order of the icon of the first function, which is moved from the operation window of another job execution device to the operation window of one job execution device, and the icon of the first function, which is originally displayed in the operation window of one job execution device.

In this embodiment, the device for integrating the data obtained by the distribution process and/or the data integration order in which the data obtained by the distribution process are integrated, is changed in accordance with the overlapping order of the icon of the first function, which is moved from the operation window of another job execution device to the operation window of one job execution device, and the icon of the first function, which is originally displayed in the operation window of one job execution device.

In this embodiment, the size of the icon of the first function, which is moved from the operation window of another job execution device to the operation window of one job execution device and/or the size of the icon of the first function, which is originally displayed in the operation window of one job execution device, can be changed, and the content of the distribution process is changed in accordance with the size relation thereof.

In this embodiment, the distribution ratio of the process for executing the job is changed in accordance with the size ratio of the icon of the first function, which is moved from the operation window of another job execution device to the operation window of one job execution device, and the icon of the first function, which is originally displayed in the operation window of one job execution device.

In this embodiment, the authentication result obtained in one job execution device is diverted for the user authentication of another job execution device.

In this embodiment, another job execution device sets one job execution device as the destination to which the process for executing the job is distributed. When the request of the distribution process is received from another job execution device, one job execution device executes the job in accordance with the request.

According to the job execution device, a user can easily set the job distribution process.

Although embodiments of the present invention have been described and illustrated in detail, it is clearly understood that the same is by way of illustration and example only and not limitation, the scope of the present invention should be interpreted by terms of the appended claims.

What is claimed is:

1. A job execution device, comprising:
an operation panel having a display and an operation receiver;
a job executor for executing a job;
a communicator for communicating with another job execution device via a network; and
a hardware processor that:
obtains information for displaying an operation window of the another job execution device and displays an operation window of the job execution device and the operation window of the another job execution device on the operation panel of the job execution device so as to arrange the operation window of the job execution device and the operation window of the another job execution device;
receives a setting of a distribution process for distributing a process for executing the job relating to a first function between the job execution device and the another job execution device by a predetermined operation, when a selection button of the first function exists in both of the operation window of the job execution device and the operation window of the another job execution device which are arranged and displayed on the operation panel; and
instructs the job executor of the job execution device and the another job execution device to carry out the distribution process for distributing the process for executing the job relating to the first function, when an entry of the job relating to the first function is received in a situation in which the distribution process for distributing the process for executing the job relating to the first function is set.

2. The job execution device of claim 1, wherein the selection button is an icon, and
the predetermined operation is an operation for moving the icon of the first function, which is displayed in the operation window of the another job execution device, to the operation window of the job execution device.

3. The job execution device of claim 2, wherein the operation for moving the icon is a drag and drop operation for moving the icon.

4. The job execution device of claim 2, wherein a content of the distribution process is changed in accordance with a positional relation between the icon of the first function, which is moved from the operation window of the another job execution device to the operation window of the job execution device, and the icon of the first function, which is originally displayed in the operation window of the job execution device.

5. The job execution device of claim 4, wherein the predetermined operation is an operation for overlapping the icon of the first function, which is moved from the operation window of the another job execution device to the operation window of the job execution device, and the icon of the first function, which is originally displayed in the operation window of the job execution device, wherein an overlapping order of the icon of the first function, which is moved from the operation window of the another job execution device to the operation window of the job execution device, and the icon of the first function, which is originally displayed in the operation window of the job execution device, can be changed, and the hardware processor changes a job execution device to be preferentially used for an execution of the job between the job execution device and the another job execution device, in accordance with the overlapping order of the icon of the first function, which is moved from the operation window of the another job execution device to the operation window of the job execution device, and the icon of the first function, which is originally displayed in the operation window of the job execution device.

6. The job execution device of claim 4, wherein the predetermined operation is an operation for overlapping the icon of the first function, which is moved from the operation window of the another job execution device to the operation window of the job execution device, and the icon of the first function, which is originally displayed in the operation window of the job execution device, wherein an overlapping order of the icon of the first function, which is moved from the operation window of the another job execution device to the operation window of the job execution device, and the icon of the first function, which is originally displayed in the operation window of the job execution device, can be changed, and the hardware processor changes a device for integrating data obtained by the distribution process and/or a data integration order in which the data obtained by the distribution process are integrated, in accordance with the overlapping order of the icon of the first function, which is moved from the operation window of the another job execution device to the operation window of the job execution device, and the icon of the first function, which is originally displayed in the operation window of the job execution device.

7. The job execution device of claim 2, wherein a size of the icon of the first function, which is moved from the operation window of the another job execution device to the operation window of the job execution device and/or a size of the icon of the first function, which is originally displayed in the operation window of the job execution device, can be changed, and a content of the distribution process is changed in accordance with a size relation of the icon of the first function, which is moved from the operation window of the another job execution device to the operation window of the job execution device, and the icon of the first function, which is originally displayed in the operation window of the job execution device.

8. The job execution device of claim 7, wherein a distribution ratio of the process for executing the job between the job execution device and the another job execution device is changed in accordance with a size ratio of the icon of the first function, which is moved from the operation window of the another job execution device to the operation window of the job execution device, and the icon of the first function, which is originally displayed in the operation window of the job execution device.

9. The job execution device of claim 1, further comprising: an authenticator that authenticates a user;

wherein the job execution device instructs the another job execution device to authenticate the user by using authentication information received by the authenticator or an authentication result in the authenticator.

10. The job execution device of claim 1, wherein when a request of the distribution process is received from the another job execution device, the job execution device executes the job in accordance with the request.

* * * * *